US005586583A

United States Patent [19]
Edwards et al.

[11] Patent Number: 5,586,583
[45] Date of Patent: Dec. 24, 1996

[54] FLUID EXCHANGER WITH FLUID RECONCILIATION

[75] Inventors: Robert W. Edwards, Ooltewah; Terry M. Fulmer, Chattanooga; Patrick J. Schultz, Hixson, all of Tenn.

[73] Assignee: Tokheim Corporation, Fort Wayne, Ind.

[21] Appl. No.: 308,395

[22] Filed: Sep. 19, 1994

Related U.S. Application Data

[63] Continuation of Ser. No. 114,377, Aug. 30, 1993, abandoned, which is a continuation of Ser. No. 823,850, Jan. 22, 1992, Pat. No. 5,273,085.

[51] Int. Cl.$^6$ .................... B65B 1/30; B65B 3/26
[52] U.S. Cl. ............... 141/83; 141/94; 141/95; 141/65; 141/98; 184/1.5; 184/105.1
[58] Field of Search .............. 141/1, 21, 65–67, 141/83, 94, 95, 192, 198, 98; 184/1.5, 105.1; 222/134, 135, 2; 73/863.81, 863.86; 128/205.18

[56] References Cited

U.S. PATENT DOCUMENTS

| | | | |
|---|---|---|---|
| 3,765,567 | 10/1973 | Maiocco | 222/30 |
| 3,858,449 | 1/1975 | Singer | 73/422 |
| 4,085,313 | 4/1978 | Van Ness | 235/419 |
| 4,095,673 | 6/1978 | Takeuchi | 184/1.5 |
| 4,193,487 | 3/1980 | Takeuchi | 194/9 |
| 4,508,195 | 4/1985 | Millet | 184/1.5 |
| 4,548,088 | 10/1985 | Hood, Jr. | 73/864 |
| 4,869,346 | 9/1989 | Nelson | 184/1.5 |
| 4,881,581 | 11/1989 | Hollerback | 141/1 |
| 4,884,660 | 12/1989 | Bedi | 184/1.5 |
| 4,927,056 | 5/1990 | Glover | 222/1 |
| 4,938,315 | 7/1990 | Ohta et al. | 184/1.5 |
| 4,951,784 | 9/1990 | Bedi | 184/1.5 |
| 4,969,495 | 11/1990 | Grant | 141/98 |
| 4,976,233 | 12/1990 | Bedi | 123/196 R |
| 5,044,334 | 9/1991 | Bedi | 123/196 R |
| 5,092,429 | 3/1992 | Linaers | 184/1.5 |
| 5,154,775 | 10/1992 | Bedi | 134/22.1 |
| 5,273,085 | 12/1993 | Edwards et al. | 141/83 |

FOREIGN PATENT DOCUMENTS

| | | | |
|---|---|---|---|
| 1233084 | 2/1988 | Canada | 123/256 |
| 0337593 | 10/1989 | European Pat. Off. | |
| 2252462 | 5/1974 | Germany | |
| 1027250 | 4/1966 | United Kingdom | |
| PCT/US91/02790 | 11/1991 | WIPO | |
| WO91/1736 | 11/1991 | WIPO | |

*Primary Examiner*—Henry J. Recla
*Assistant Examiner*—Steven O. Douglas

[57] ABSTRACT

A fluid exchange apparatus for the transfer of fluids from a first containment area to a second containment area, including a total fluid reconciliation process, whereby the same amount of fluid transferred from the first containment area to the second containment area is replenished into the first containment area, or is replenished to a preset amount. The fluid exchanger includes an evacuation section having a vacuum pump therein, and a fill section. The fluid being vacated from the first containment area is transferred to the second containment area by vacuum pressure introduced into the first containment area. An air purge is used to drive fluid out of the fluid passages/filters into the first containment area. The pressure may be developed internally to the fluid exchange apparatus or externally thereto. CPU controlled electronics are utilized to measure, monitor, and control, via a user interface screen, the fluid exchange machine.

8 Claims, 7 Drawing Sheets

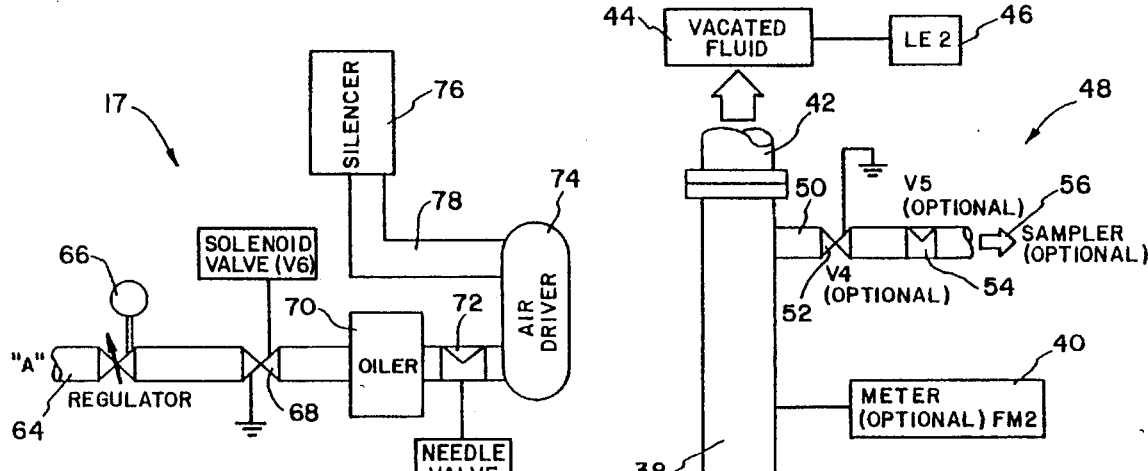
FIG. 1B
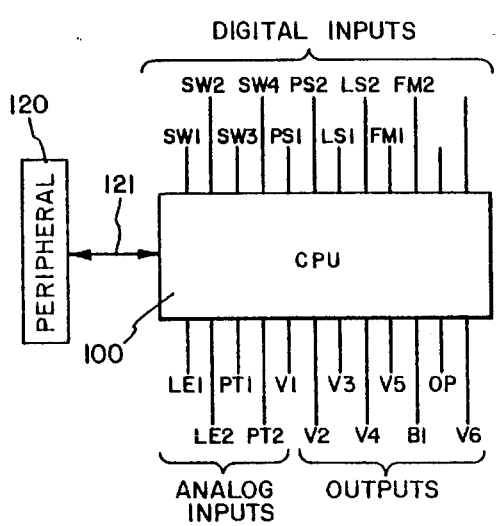
FIG. 8
FIG. 2

5,586,583

FLUID EXCHANGER WITH FLUID RECONCILIATION

This is a continuation of application Ser. No. 08/114,377, filed Aug. 30, 1993, now abandoned, which is a continuation of application Ser. No. 07/823,850, now U.S. Pat. No 5,273,085.

BACKGROUND OF THE INVENTION

The present invention relates to the transfer and exchange of fluids and, more particularly, to the automatic transfer of fluids from a first containment area to a second containment area with a reconciliatory replenishment of fluid to the first containment area from a new fluid source.

With the growing concern of the potential impact hazardous fluids and the possible potential impact certain other fluids have on the environment, it is prudent to cautiously and carefully handle and use these kind of fluids. It is necessary to make sure that in utilizing potentially harmful fluids they are not wasted or spilled onto the ground only to contaminate the surrounding environment.

In dealing with these problems, the government has promulgated regulations aimed at controlling certain fluids that are radioactive, caustic, toxic, carcinogenic, corrosive, volatile, etc. in order to protect ourselves and the environment. Various schedules have been devised that list the fluids which are to be accorded special treatment due to their nature. The fluids that have been listed by the government as "hazardous" requires handlers to follow strict regulations concerning use, storage, and transportation. Instead of letting these type of fluids leak or leach into the environment after being used, they must be contained and then properly disposed or recycled.

Certain fluids regardless of their classification, can be recycled for reuse. Recycling helps preserve and protect the environment as well as conserve natural resources. In the recycling of fluids, it is prudent that as much of the fluid be recovered as possible, therefore the containment of the fluid is important.

One fluid that is currently of concern is oil. While at present, oil is not scheduled as a hazardous fluid within government regulations and definitions, oil is recyclable, potentially hazardous to the environment, and is contemplated to eventually be listed as hazardous within government regulations.

Most fluids, including oil, are utilized in contained spaces that eventually need to be drained and refilled. It is often messy and time-consuming to drain and refill these contained spaces as well as difficult to put the recovered fluid into a storage or shipping container once the contained space has been drained. In addition, the contained space generally needs to be thoroughly flushed of the old fluid prior to the refilling. Further, the contained space will most likely need to be replenished with a reconciliatory amount of fluid.

Such a contained space is an internal combustion engine wherein the fluid is oil. The contained space is the engine block and its associated parts that carry, hold, and filter the oil circulating throughout the engine. Engine oil must periodically be changed, i.e. the oil must be purged from the engine and new oil added thereto. Presently, oil is drained from the engine by the effects of gravity while the oil filter is then removed, most likely with a full load of oil still trapped therein. Once a new filter has been installed, new oil is pumped into the engine, the amount of oil determined by the manufacturer's specifications, or until overflow. The oil is generally drained into open barrels of some sort while some of the oil leaks onto the ground.

It is thus desired to have a fluid exchange system that will overcome the inadequacies inherent in the prior art systems by providing a safe and clean automatic operating device. This accomplished by providing automatic electronic control of the entire system and process, and through a user interface, control the automatic process at key intervals when prompted by the apparatus via a user interface control display or panel.

SUMMARY OF THE INVENTION

The present invention provides a fluid exchange apparatus that automatically vacates a first fluid containment area and transfers the fluid into a second fluid containment area. After this, the first fluid containment area is automatically replenished with a reconciliatory amount of new fluid, with the automatic process controlled at key intervals by a user when prompted through a user interface control panel.

The fluid exchanger includes an evacuation section and a fill section each having an inlet port and an outlet port. The inlet port of the evacuation section and the outlet port of the fill section are connected to a first fluid containment area to be vacated, while the outlet port of the evacuation section is connected to a second fluid containment area for receiving the vacated fluid. The inlet port of the fill section is connected to a replenishment fluid containment area. Compressed air from the fill section is utilized to blow the fluid from the first fluid containment area into the evacuation section which utilizes vacuum pressure to assist in the vacating of the fluid into the second fluid containment area. The first fluid containment area is then replenished by a reconciliatory amount of fluid through the fill section.

An apparatus for the automatic evacuation of a fluid from a first containment area into a second containment area, including automatic replenishment of the first containment with a reconciliatory amount of new fluid from a fluid source, the apparatus comprising; means for automatically evacuating the fluid from the first containment area, the evacuation means having an inlet and an outlet, the evacuation inlet in communication with the first containment area, and the evacuation outlet in communication with the second containment area, means for automatically filling the first containment area with the reconciliatory amount of new fluid, said filling means having an inlet and an outlet, the filling inlet in communication with the new fluid source, and the filling outlet in communication with the first containment area, and automatic electronic control means in communication with the evacuation means and the filling means for the automatic evacuation of fluid from the first containment area into the second containment area and the automatic reconciliatory replenishment of fluid into the first containment area from the fluid source.

In one form thereof, the present fluid exchanger automatically vacates the first fluid containment area into a second fluid containment area, and automatically fills the first fluid containment area with new fluid in response to automatically controlled valves and pumps through a user interface panel that prompts the user at key intervals during the exchange process.

In another form thereof, the present fluid exchanger automatically vacates and measures the amount of vacated fluid flowing from the first fluid containment area into the second fluid containment area, and then automatically replenishes the first containment area with a reconciliatory amount of fluid. An optional sampling section can be provided to automatically withdraw a requisite amount of fluid into a sample container in order to be analyzed later.

A user interface for the fluid exchanger is provided in the form of a display panel with user interface selection switches providing visual communication with the user, and audio annunciators for audio communications with the user.

In addition, the fluid exchanger is connected to peripheral storage and communication devices for retention and downloading of various information upon request or polling of the peripheral. These peripherals include radio and satellite communications, card readers, scanners, and other dedicated and non-dedicated devices.

It is an advantage of the present invention that the exchange of fluid is automatically accomplished with minimal effort.

It is another advantage of the present invention that the exchange of fluid is accomplished in a minimal amount of time.

It is yet another advantage of the present invention that user interface with the exchange process is minimal.

It is further an advantage of the present invention that the exchange process is accomplished in an environmentally safe manner.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1B is a schematic representation of the optional air pump system;

FIG. 2 is a schematic representation of the second half (evacuation section) of the present invention;

FIG. 8 is an input/output schematic of the CPU according to an embodiment of the present invention.

Figure 1A:
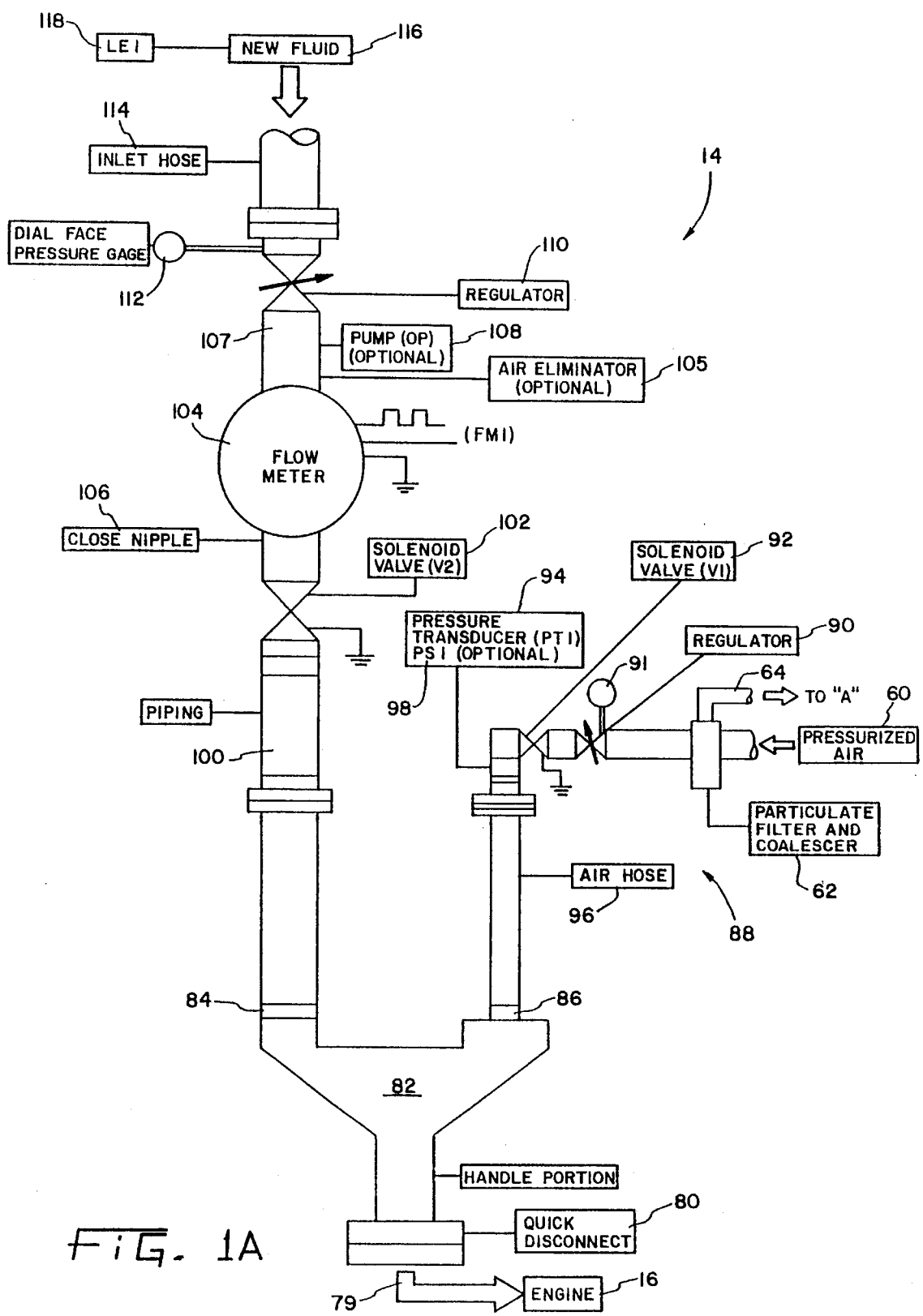
FIG. 1A is a schematic representation of the first half (fill section) of the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Figure 4:
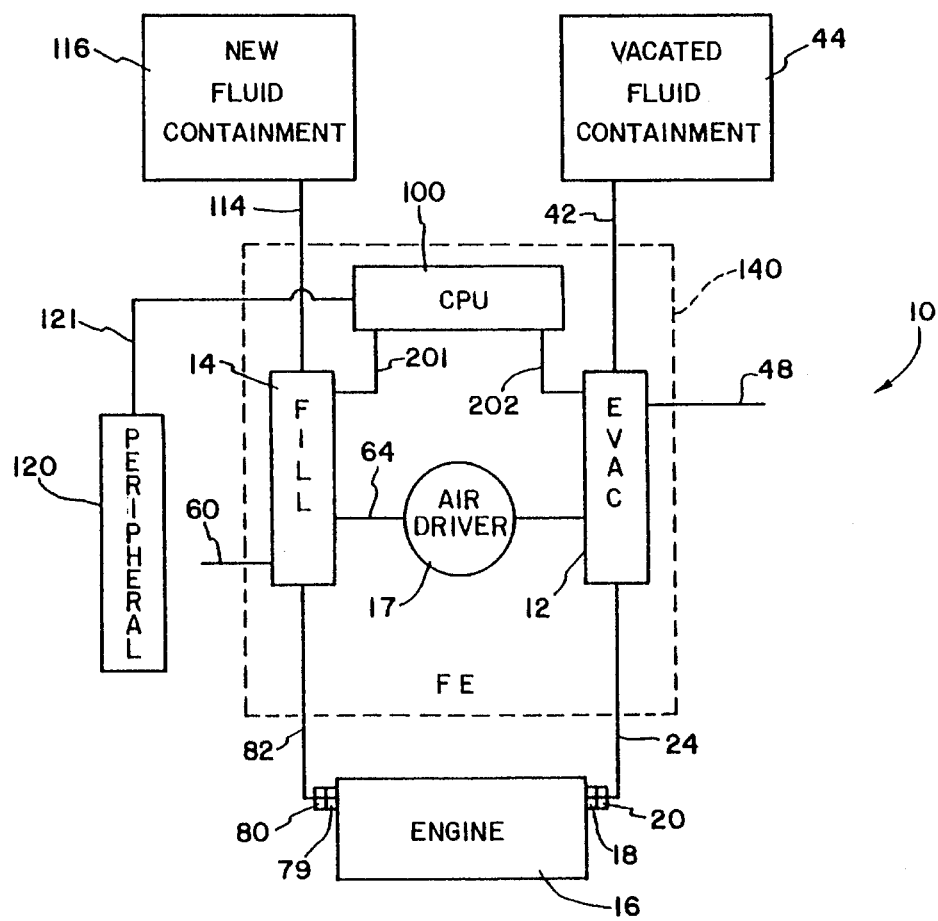
FIG. 4 is a block diagram of the fluid exchanger of the present invention.

Referring to FIG. 4, there is shown in one form thereof, the fluid exchanger (FE) 10 of the present invention. FE 10 consists of a housing 140 that may be a portable unit designed to be transported easily from one location to another or may be a stationary unit designed to be secured to a non-moving platform providing adequate means for securing the housing to the platform. Alternatively, housing 140 may be adapted to be mounted to a vehicle and be powered by the vehicle battery, or the housing 140 may be a portable hand operated unit. Although described in detail hereinbelow in conjunction with FIGS. 1–2, FE 10 generally consists of an evacuation section 12 and a fill section 14 both connected through respective conduits 24 and 82 to a first fluid containment area 16 herein designated as an engine. Each conduit 24 and 82 respectively has on one end thereof a connection fitting 20 and 79, preferably a quick disconnect type, that attaches to similar mating connections 18 and 80 of engine 16. Any type of connection fitting may be used to connect the first fluid containment area to the conduits of FE 10, however, in the preferred embodiment, the connection fittings are of a quick disconnect type. Evacuation section 12 is in communication via conduit 42 with a second fluid containment area 44 generally designated the vacated fluid containment area, while fill section. 14 is in communication via conduit 114 to new fluid containment area 116 designated a fluid replenishment area.

With respect to the embodiments described above in connection with the portability or non-portability of the FE, vacated fluid containment area 44 and new fluid containment area 116 may or may not, either alone or in combination, be integral with the FE. Thus, where the FE is a stationary unit, both containment areas would most likely be permanently dedicated to the FE, while in the portable FE units, either one or both of the containment areas would be separate from and thus attached to the FE prior to commencing. In addition, the new fluid or replenishment area can likewise constitute an integral part of the FE or be separate from but attachable thereto.

Evacuation section 12 includes an optional sampling section shown as 48, while an optional air driver 17 may also be connected thereto, both of which are described hereinbelow. Fill section 14 is connected to a pressurized air source 60 and optionally connected to air driver 17 through conduit 64. Both evacuation section 12 and fill section 14 are in communication with a CPU 100 through various electrical lines collectively represented in FIG. 4 as lines 201 and 202, while CPU 100 can be optionally in communication with peripheral(s) 120 via line 121. Peripheral 120 can be defined as any extrinsic feature or component (from the FE itself) that provides data storage and/or communication to and from the FE and particularly CPU 100. Thus, it is contemplated that peripheral 120 encompass data storage capabilities for information received by CPU 100. In addition to or alternatively, peripheral 120 is contemplated to encompass radio communications, including microwaves, satellite communications, radio frequency identification, hand held communications devices, bar code readers, computer interfaces including modems and dedicated devices, card reader user interface devices, and cash readers. In addition, various other devices are contemplated to be in communication or interfaced with CPU 100, depending on the desired objective, as described in connection with FIG. 9 hereinbelow.

Referring now to FIGS. 1A, 1B, and 2, there is shown an embodiment of the present fluid exchange (FE) apparatus 10. FE 10 basically consists of two parts, an evacuation section 12 (FIG. 2) and a fill section 14 (FIG. 1A). FIG. 1B schematically represents an optional air drive system 17 discussed hereinbelow. FE 10, consisting of evacuation section 12 and fill section 14, is designed to be housed in one complete unit although shown herein as two separate figures.

Evacuation section 12 is adapted to be connected to a first containment area 16 containing the fluid to be vacated, and then replenished, that generally can be any type of containment area, and is shown in FIG. 2 as an engine having oil as the fluid. Engine 16 includes an outlet or evacuation port 18 incorporating a connector thereon to which is releasably attached a mating connector 20 of evacuation section 12 for permitting communication between engine 16 and evacuation section 12. Connector 20 can be any type of connector adapted to attach to evacuation port 18 but which is preferably a quick disconnect type connector adapted to attach to a like quick disconnect type connector at evacuation port 18 for easy connection and disconnection of the present FE to the first containment area. Connector 20 is disposed at one end 22 of a pipe section 24 that is connected at the other end 26 to another pipe section 28 having a strainer 30 for filtering out particulates from and generally straining the oil as it is vacated from engine 16.

Disposed downstream of strainer 30 is a pressure transducer 32 for sensing the pressure in pipe 28. Pressure transducer 32 can be a piezo resistance or capacitance transducer which generates an analog output signal PT2 that is connected to a CPU 100 at analog input PT2 (see FIG. 8). Instead of a pressure transducer 32 which generates an electrical signal, a dedicated device such as a bar meter or other similar device could be utilized, however where the unit is automatic, it would be preferable to have a transducer that generates an electrical output signal. As an optional feature, pressure transducer 32 may also include a pressure switch 34 which generates an output signal PS2 that is connected to CPU 100 at digital input PS2 (see FIG. 8). Although described in more detail hereinbelow with reference to the operation of the present invention in conjunction with the flow diagrams of FIGS. 6–8, pressure switch 34 reacts to a change in pressure to stop or permit fluid flow. Downstream of pressure transducer 32 is a pump 36 to create the necessary vacuum pressure in evacuation section 12 in order to draw out and thus vacate engine 16 of oil. Pump 36 can be any type of pump that can handle fluids of different weights and viscosities, and as an example, pump 36 can be an air driven pump.

An exemplary air driven pump system is shown in FIG. 1B (with reference to FIG. 1A), wherein pressurized air from pressurized air source 60 is branched from a particulate filter and coalescer 62 through piping 64 to "A" into a regulator 66. Regulator 66 is an analog meter type regulator that is manually controlled, although an automatic regulator is contemplated within the scope of this invention and could be used. A solenoid valve 68 having a control input V6 from output V6 of CPU 100 (FIG. 8), regulates the air flow into the system via CPU 100, and is disposed upstream of oiler 70. Oiler 70 lubricates the incoming pressurized air with a small amount of lubricant such as oil before the pressurized air is introduced through needle valve 72 and into air driver 74. Air driver 74 provides the force for pump 36 should pump 36 be air driven. In addition, air driver 74 is connected with a silencer 76 which is in communication with a discharge tube 78 from air driver 74 to attenuate the noise generated by the pressurized air from air driver 74. Thus, pump 36 may be an air pump for creating a vacuum pressure in evacuation section 12 for drawing up the fluid stored in engine 16.

Referring back now to FIG. 2, downstream of pump 36 is an optional air eliminator 37 for deaerating the oil prior to storage. Removing the entrained air from the oil eliminates foaming of the oil and it associated problems. Also disposed in pipe 38 downstream of pump 36 is an optional analog or digital flow meter 40, having, if digital, an optional digital output FM2 that is connected to optional digital input FM2 of CPU 100 (FIG. 8). If the system is automatic and connected to CPU 100, flow meter 40 measures the flow of oil (fluid) in pipe 38 and can store the measured amount of oil in peripheral device 120 (FIG. 8) in communication with CPU 100 via line 121 or other storage device integral CPU 100. The measured amount of oil stored in peripheral device 120 or otherwise is used to help determine the amount of reconciliatory fluid to be replenished in engine 16, by permitting the same amount of oil to flow through fill section 14, or to keep track of old oil. Connected to pipe 38 downstream optional flow meter 40 is a pipe section 2 communicating with a waste fluid container 44 incorporating a waste fluid level monitor 46 having an output LE2 connected to an input LE2 of CPU 100. Waste fluid level monitor 46 indicates the level of waste fluid in waste container 44 in order to prompt the owner or operator of the FE that it is time to connect a new waste container 44 to pipe section 42 and send the filled waste container 44 to a designated disposal or recycling area, or that it is time to empty waste container 44.

In utilizing the present FE, it might be necessary or advantageous to test or analyze the vacated fluid in order to determine its composition or detect contaminants within the fluid. The FE thus includes an optional sampling section 48 that is disposed between pump 36 (or optional flow meter 40) and pipe section 42. Sampling section 48 is connected to and in communication with pipe section 38 via pipe section 50 having a solenoid valve 52 with an optional automatically controlled digital input V4 controlled by output V4 of CPU 100. Disposed downstream of solenoid valve 52 is an optional needle valve 54 having an optional automatically controlled digital input V5 controlled by output V5 of CPU 100 and a sampler output 56 for filling sampling or specimen bottles or jars (not shown). In the automatic mode, CPU 100 controls the amount of fluid discharged into sampling section 48 and thus into the sampling bottles by regulating solenoid valve 52 and needle valve 54. It is contemplated that the amount of fluid discharged into sampling section 48 is operator adjustable by programming CPU 100 accordingly, or by optionally allowing the user to interface and control the operation through peripheral 120, as when peripheral 120 is a communications device as described herein above. Alternatively, sampler 48 may be an in-line bypass sampler that opens directly into the specimen bottle.

Referring now to FIG. 1A, there is shown the fill section 14 connected to engine 16 via connector 79 and connector 80 that are analogous to connectors 18 and 20 in their form and function, and likewise is contemplated to be a quick disconnect connector. Attached to connector 80 is a handle portion 82 having an optional one-way fluid valve 84 and an optional one-way gas (air) valve 86, both being arranged so as to permit fluid/gas flow into handle portion 82 and thus into engine 16 but not permit fluid/gas flow in the reverse direction. Connected to handle portion 80 at one-way valve 86 is air intake and regulating section 88 connected to and in communication with one-way valve 86. Intake and regulating section 88 receives pressurized air from pressurized air source 60 through optional particulate filter and coalescer 62 into a manual regulator 90 having a dial face pressure gauge or meter 91. Regulator 90 and gauge 91 give a visual indication of the pressure of incoming pressurized air and manual means for regulating the same. Connected downstream of regulator 90 is a solenoid valve 92 having an input V1 that is connected to an output V1 of CPU 100 that controls the opening and closing of solenoid valve 92 to allow and stop the flow of pressurized air into intake and regulating section 88. In addition, disposed downstream solenoid valve 92 is an optional pressure transducer 94 having an analog output PT1 that is connected to analog input PT1 of CPU 100 for indicating the head pressure through connected air hose 96 and intake and regulating section 88. Optionally attached to pressure transducer 94 is a pressure switch 98 having a digital output PS1 that is in communication with digital input PS1 of CPU 100 for indicating to CPU 100 that pressure switch 98 has opened or closed. An optional timed cycle can be used instead of, or in conjunction with the aforementioned sensing devices. Intake and regulating section 88 is utilized to force pressurized air into engine 16 in order to force the oil out of the engine block, galley ways, oil filter, and the like (all not shown). The method of operation of intake and regulating section 88 along with the purging operation of evacuation section 12 will be explained in greater detail with reference to flow diagram FIGS. 6–8 hereinbelow.

Connected upstream to one-way valve 84 is pipe section 100 having on its end distal one-way valve 84 a solenoid valve 102 having an input V2 connected to output V2 of CPU 100 for communication therewith. Solenoid valve 102 automatically opens and closes the flow of fluid into pipe section 100 and eventually into engine 16 through communication with CPU 100 via input and output V2 according to the operation of the present invention. Connected upstream to solenoid valve 102 is a flow meter 104, with an optional close nipple 106, for measuring the amount of incoming new fluid for replenishment into the engine 16. Flow meter 104 can be any type of flow meter, but is here shown as a pulse-type flow meter having a digital output FM1 that is connected to digital input FM1 of CPU 100. In an automated or CPU controlled system, flow meter 104 could be any type of meter that interfaces with and provides communication to the CPU or equivalent structure, however, flow meter 104 could be a visual meter. Upstream of flow meter 104 in pipe section 107 is an optional air elimination device 105 for deaerating the incoming oil. The deaeration of the incoming oil may be necessary if the oil has not previously been deaerated. Also upstream of flow meter 104 in pipe section 107 that optionally includes a pump 108 having an input OP that communicates with output OP of CPU 100 for controlling pump 108. Pipe section 107 terminates distal to flow meter 104 in an optional manual regulator 110 having a dial face pressure gauge 112 for visually indicating the pressure of incoming oil. Connected upstream of regulator 110 is inlet hose 114 that is connected to a new fluid retention area 116 which includes an analog fluid level indicator 118 having analog output LE1 that is in communication with analog input LE1 of CPU 100 for indicating the amount of new fluid remaining in new fluid retention area 116. Additional CPU 100 tank level monitoring can be included as an optional feature for expanded tank management. New fluid retention area 116 is disconnectable from inlet hose 114 and stores new fluid to replenish engine (first containment area) 16. Fluid stored in retention area 116 may or may not be under pressure.

Pump 108 is deemed optional since its inclusion is not necessary if new fluid retention area 116 is placed such that gravity will induce a flow once regulator 110 is opened to allow fluid flow. The oil or fluid in new fluid containment area 116 may also be under pressure and thus, pump 108 may or may not be used. Also, a remote mounted pump (not shown) can be used to deliver fluid to inlet hose 114.

Figure 3:
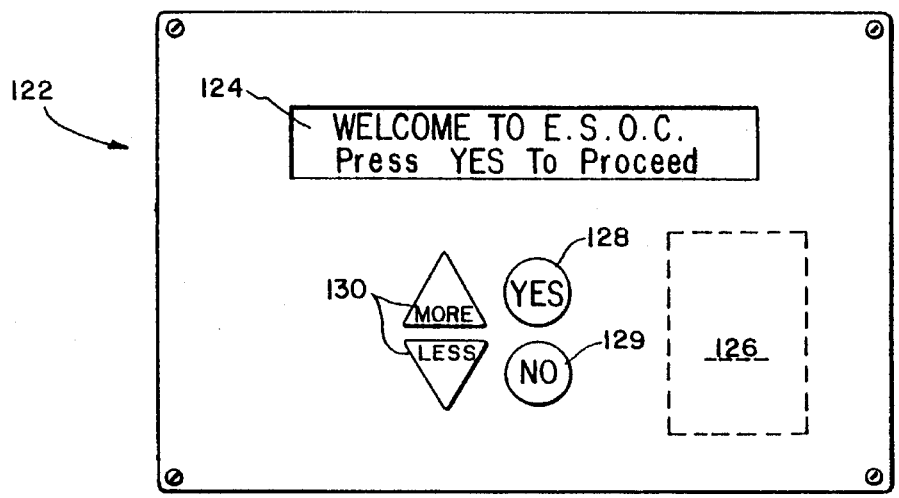
FIG. 3 is a front elevational view of the control panel of the present invention.

Referring now to FIG. 3, there is shown an exemplary front view of a control panel 122 that is adapted to interface with the user. Control panel 122 includes a general information screen 124 along with an information block 126 for displaying messages and prompting the user for responses and actions to take. Preferably, panel 122 is an LCD, vacuum florescent or LED, but it is contemplated that any type of screen may be used. In addition, panel 122 includes separate YES and NO switches 128 and 129, that are utilized to indicate to the FE the user's decisions in response to the screen displays and queries. Also, a dual switch 130 indicating MORE and LESS is provided for the user to respond to the screen displays and queries.

Figure 9:
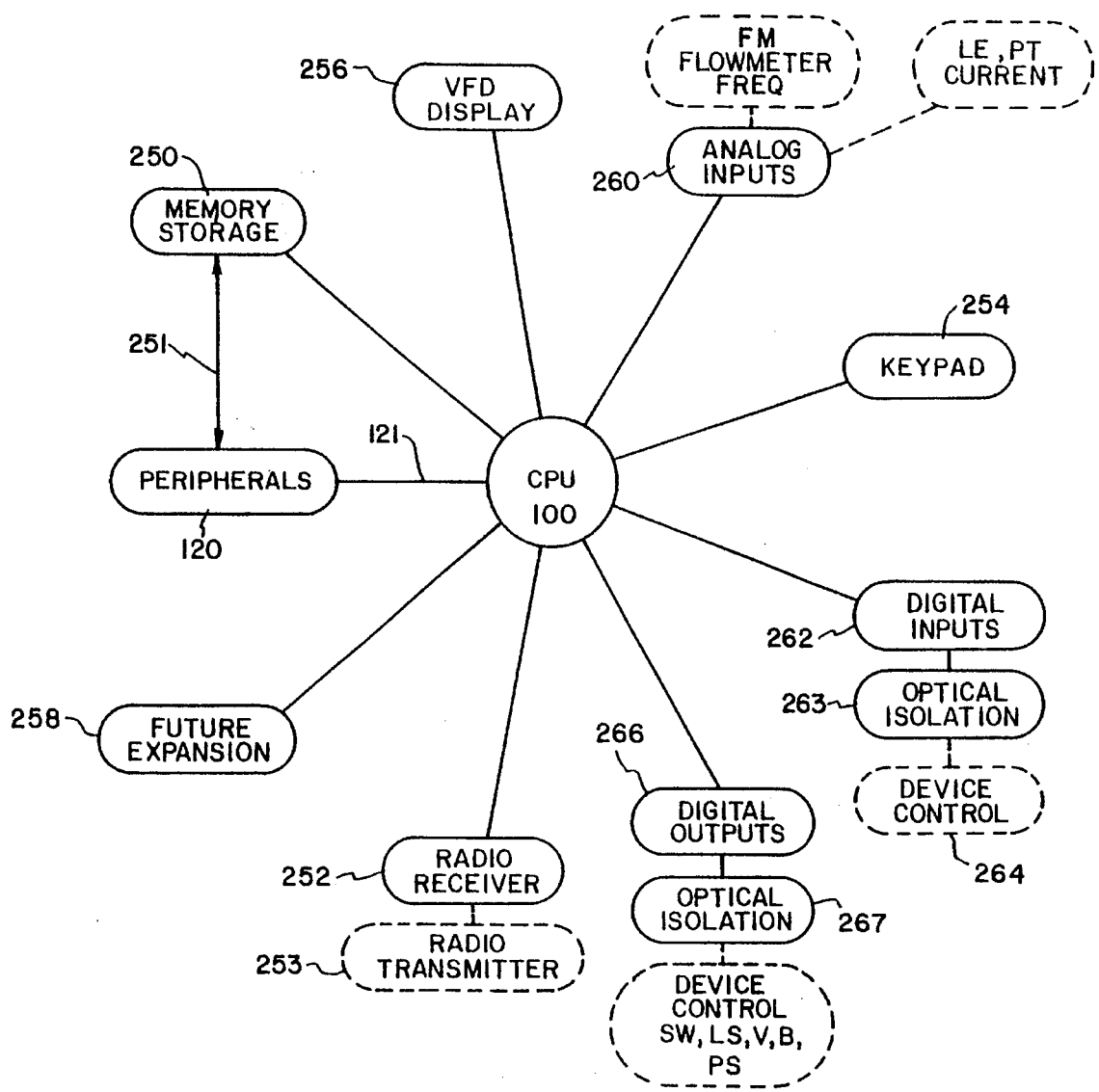
FIG. 9 is a diagram of various essential and optional peripheral, communications, and controllable devices regulated by the CPU.

Reference should now be made to FIG. 9, wherein there are shown various optional monitoring features in communication with CPU 100. A specific FE device may contain some or all of the optional monitoring features shown, dependent upon the specific needs. Also, the features shown in FIG. 9 are not a complete representation of all of the devices contemplated or within the scope of this invention. CPU 100 may be in communication with memory storage device 250 for storing information such as the total amount of fluid evacuated or filled, total amount of sample fluid taken, or other monitored information for later retrieval by the various features shown. Memory storage device 250 may optionally be in communication with peripherals 120 through line 251 for direct access and or communication with the CPU's of the various peripherals described hereinabove. CPU 100 may also be in communication with a radio receiver 252 and transmitter 253 for polling information retained by the unit. A keypad 254 for manual programming, retrieval of information, or field testing of the FE device may also be provided, as well as a VFD display 256. Expansion slots or interfaces 258 are provided to allow FE 10 to be upgraded with new technology or devices. The optional feature of monitoring other on site tanks by CPU 100 may also be possible through use of the CPU's analog and digital inputs 260 and 262. This would allow the FE device to be integrated with other equipment and devices, thus expanding the information gathering process and inventory control management. Analog inputs 260 is connected to flowmeter frequency FM as well as current sensors such as LE, PT (see FIG. 8). Digital inputs 262 includes optical isolation 263 and device control 264. CPU 100 also includes optical isolation 267 and device control such as SW, LS, V, B, and PS (see FIG. 8). These features also allow the modification and updating of the programs and parameters stored in FE 10 for custom installation or otherwise. Thus, FE 10, through the various features shown, may be a part of overall fluid management as well as modifiable for current and future use.

Figure 5:
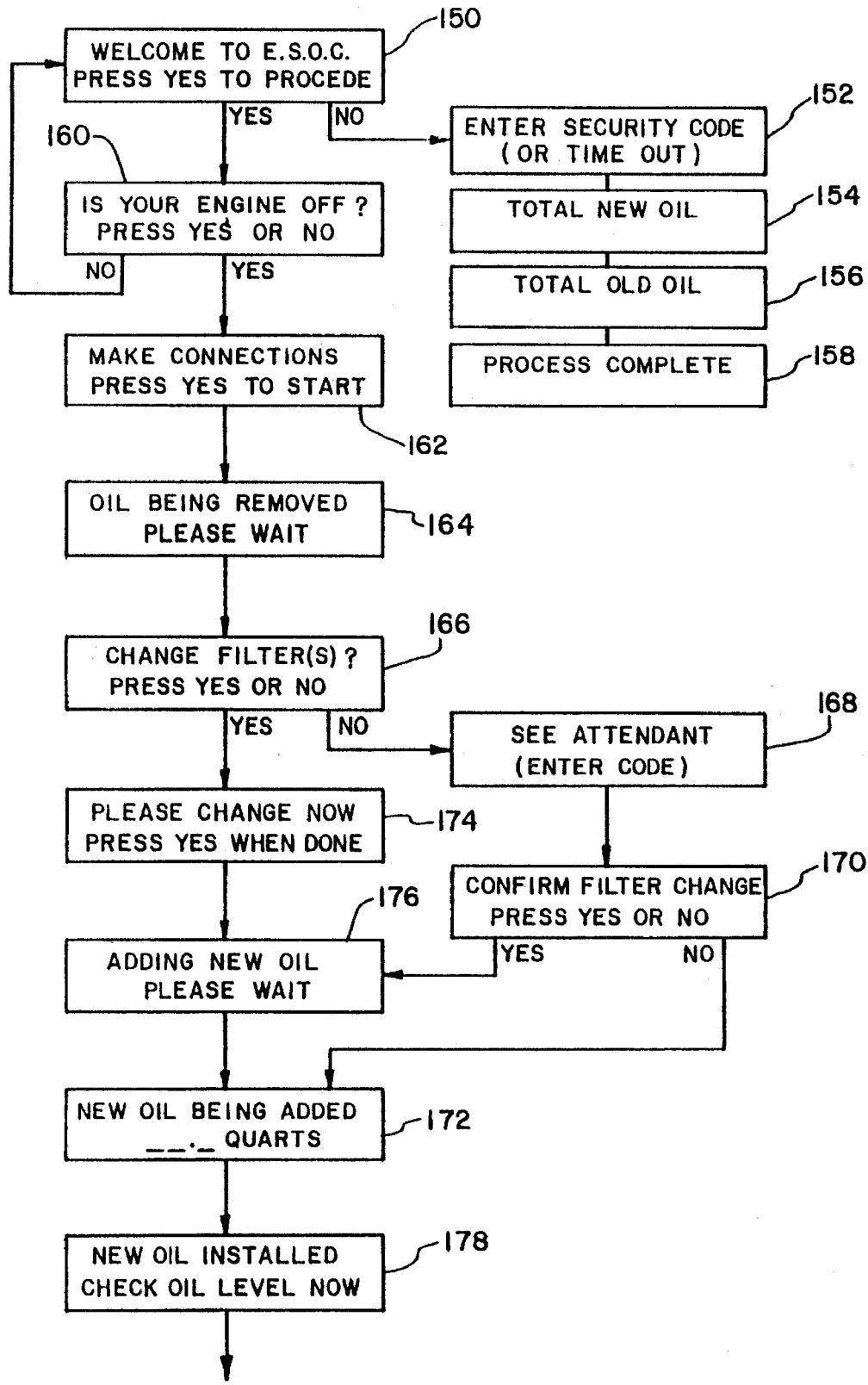
FIG. 5 is a partial flow diagram of a first operational cycle according to an embodiment of the present invention.
Figure 6:
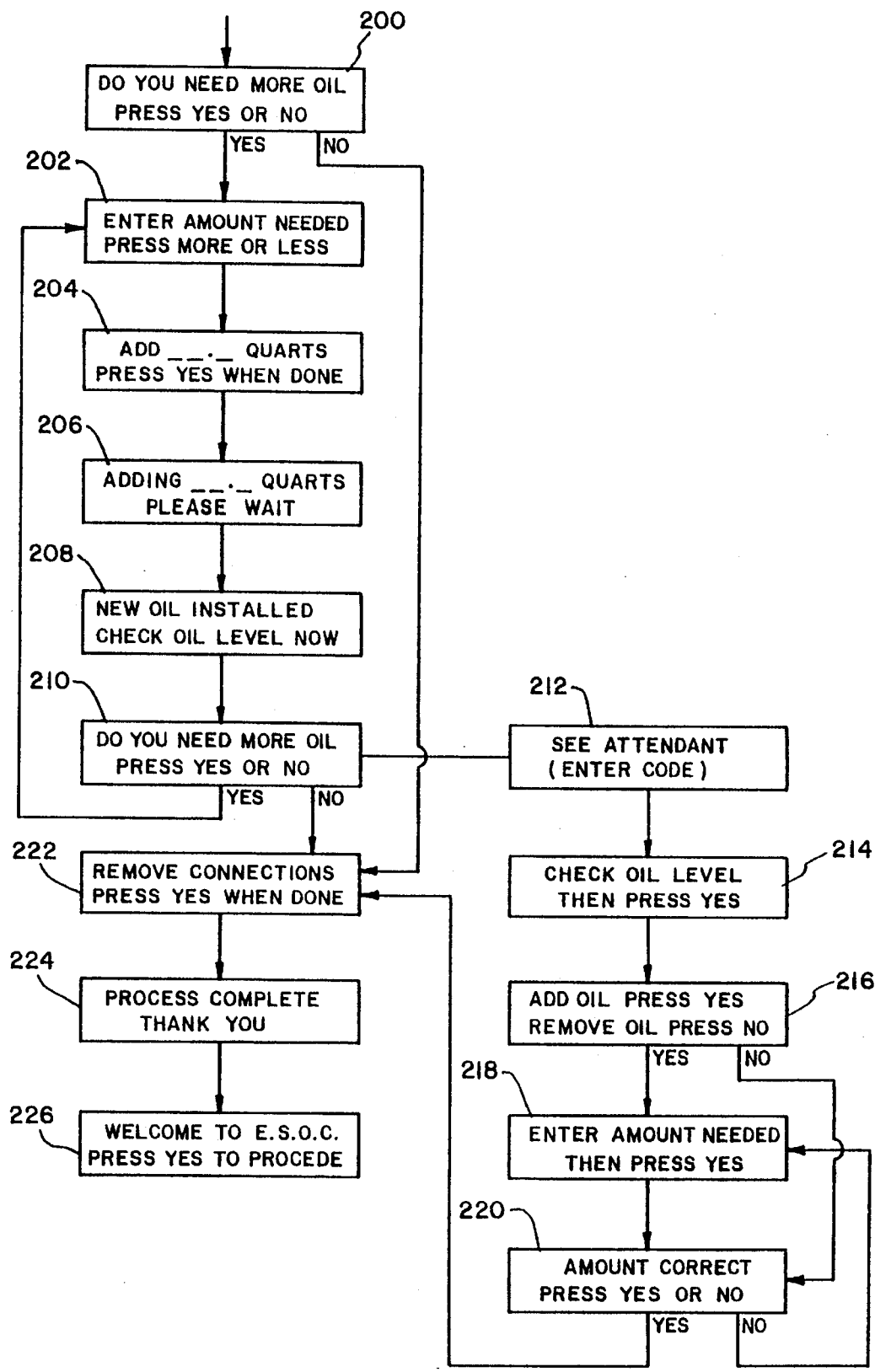
FIG. 6 is a partial flow diagram showing the second part of the operational cycle according to the present invention common to both flow diagrams of FIGS. 5 and 7.
Figure 7:
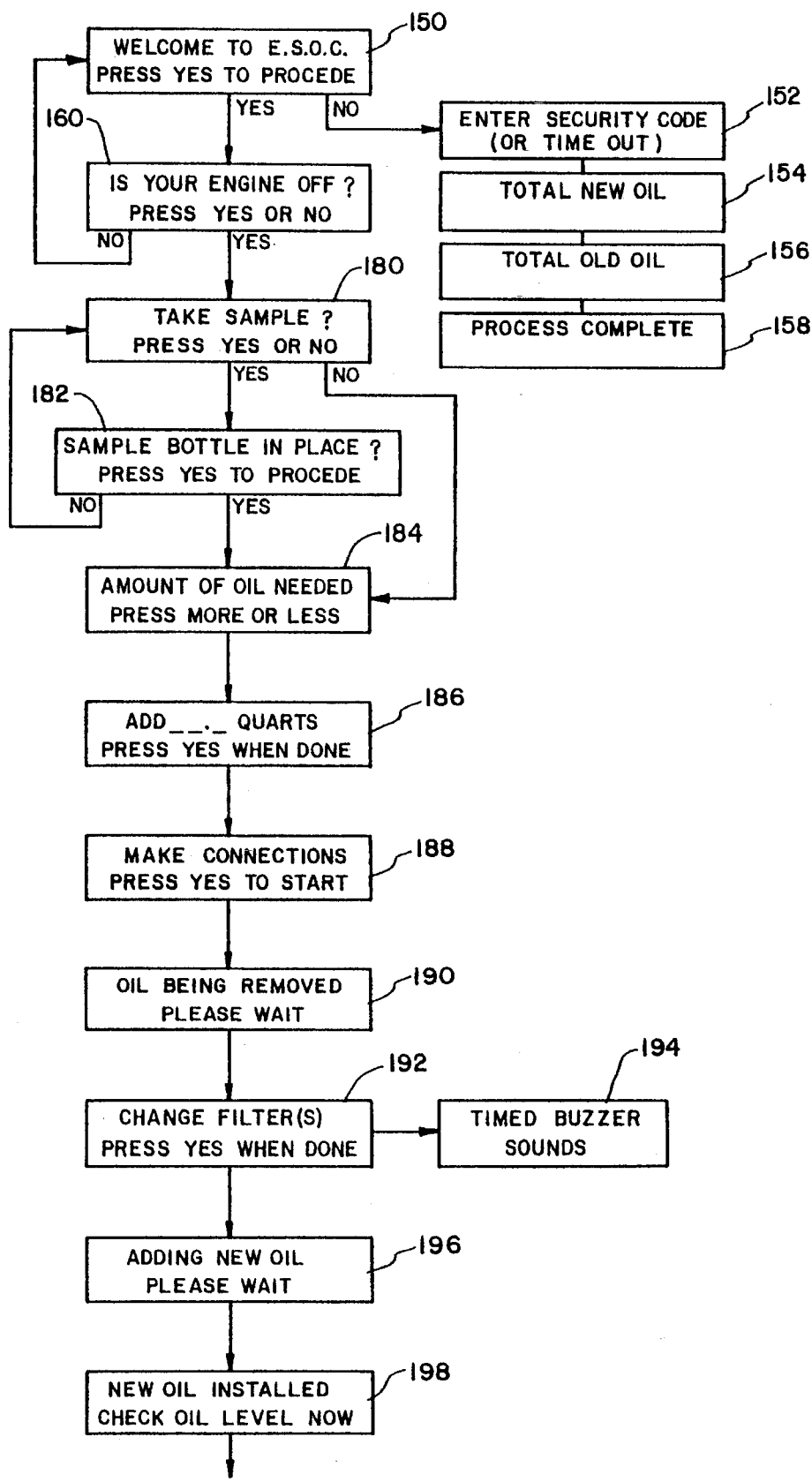
FIG. 7 is a partial flow diagram of a second operational cycle according to an embodiment of the present invention.

The operation of FE 10 will now be described with reference to the flow diagrams of FIGS. 5–7. It should be appreciated that there are actually two complete flow diagrams embodied in FIGS. 5–7, the flow diagram comprised of FIGS. 5 and 6, and the flow diagram of FIGS. 6 and 7, the flow diagram of FIG. 6 being common to both flow diagrams of FIGS. 5 and 7. It should be appreciated that these two flow diagrams are representative of the different procedures and accompanied prompts that the FE can be programmed to perform. Thus, the two flow diagrams of FIGS. 5–7 show only two possible modes of operation of the present FE. Specifically, the flow diagram of FIGS. 5 and 6 can represent the situation where the FE is utilized by a car owner at a service station or oil change shop, while the flow diagram of FIGS. 6 and 7 can represent the situation where the FE is utilized by a fleet mechanic or the like where sampling of the vacated oil may be necessary.

Referring now to the flow diagram of FIG. 5, when the user/operator wishes to start the oil change, the user is prompted 150 at which time display panel 122 indicates the message at 124. YES/NO switches 128 and 129 on panel 122 are selected by the user in response to the queries of displays 124 and 126 of panel 122. It should be noted that whenever a YES or NO response is solicited, the user makes his/her selection via YES/NO switches 128 and 129 on panel 122. If NO is the intended response and NO switch 129 is actuated, a security code is requested 152 wherein display 126 will indicate the total of new oil 154, the total old oil 156, and that the process is complete 158. It should also be noted that initially, all valves including optional valves are in the closed position to be selectively opened and closed throughout the evacuation and replenishment cycle. If YES is the response and switch 128 is actuated, display 126 prompts the user to turn off 160 the engine prior to proceeding with the actual oil change process. A NO response and associated switch actuation takes the user back to the introductory welcome 150. After the engine has been turned off, the user connects quick connect 20 of evacuation section 12 onto the quick connect 18 of the outlet side of engine 16 while quick connect 80 is attached to quick connect 79 of the inlet side of engine 16. It is assumed that the vacated fluid containment area 44 and new fluid containment area 116 are already respectively attached to conduits 42 and 114 of respective sections 12 and 14. Once the connections have been made, a YES response will begin the process.

At this time, pump 36 will begin to create vacuum pressure in pipes 28 and 24 that will be sensed by pressure transducer 32 which will provide an analog output signal PT2 to analog input PT2 of CPU 100 indicating the state of pressure. If the optional pressure switch 34 is present it will remain open while pressure is low, that is, oil is flowing into the system. At the same time, pressurized air from pressurized air source 60 is forcing air from fill section 12 through filter and coalescer 62, regulator 90, solenoid valve 91, controlled by output V1 of CPU 100 into input V1, and pressure transducer 94 having an analog output signal PT1 providing an analog signal to input PT1 of CPU 100 indicating the state of pressure or a timed on cycle controlled by CPU 100. This signal is analyzed by CPU 100 which will communicate with solenoid valve input V1 via CPU output V1 to either open or close the valve. During the evacuation process, solenoid valve is open. If pump 36 is an air driven pump, the pressurized air flow will be split at filter 62 and flow into air driver system 17 wherein solenoid valve 68 will be opened via a signal received on input V6 from CPU output V6. The vacuum pressure on the outlet of engine 16 vacates engine 16 through evacuation section 12 and into container 44. Once engine 16 has been totally evacuated as indicated by a pressure change at pressure transducer 32 and/or pressure switch 34, solenoid valve 68 closes to shut off the air flow into air driver 74. At this time a filter change request 166 is displayed, with a NO response generating a see attendant 168, and confirm change 170. A NO response displaying that "x" amount of new oil is being added 172. A YES response to a filter change generates a please change filter request 174 at which time the user changes the oil filter. A YES to proceed generates an adding new oil 176 and "x" amount of new oil added 172 displays.

With the optional meter 40 in evacuation section 12, the amount of vacated oil is measured by the rate of flow in meter 40 which generates digital pulses at output FM2 which are counted at input FM2 of CPU 100 and stored. Thus, the FE "knows" the amount of oil that has been vacated and proceeds to replenish a reconciliatory amount into the system.

When the new oil is being added, solenoid valve 102 opens via input V2 from output V2 of CPU 100 to allow new oil from new fluid container 116 to flow or be pumped via optional pump 108 again controlled by CPU 100 through output OP and pump input OP into piping 100, into handle 82 and engine 16. Flow meter 104 measures the amount of new fluid being added by digital pulses generated at output FM1 and communicated to CPU 100 via digital input FM1. Thus, the FE automatically replenishes engine 16 with a reconciliatory amount of new fluid as vacated fluid. Once this process is complete, pump 108 and/or solenoid valve 102 is turned off by CPU 100 whereupon the user is prompted to check oil level 178. CPU 100 can be programmed to allow the operator to select the desired quantity of oil to be replenished instead of automatically replacing the same amount that was removed.

Since the flow diagram of FIG. 6 is common to both flow diagrams as indicated above, reference will now be made to the flow diagram of FIG. 7 to describe the operational differences before ending with the common flow diagram of FIG. 6. Referring now to FIG. 7, when the user/operator wishes to start the oil change, the user is prompted 150 at which time display panel 122 indicates the message at 124. If NO is the intended response and NO switch 129 is actuated, a security code is requested 152 wherein display 126 will indicate the total of new oil 154, the total old oil 156, and that the process is complete 158. A YES response to proceed prompts the engine off display 160. After the engine is off, the operator is prompted whether or not a sample is to be taken 180, and if YES, the user is prompted 182 to place a sampling bottle at sampler output 56 (see FIG. 2). If a sample is to be taken, CPU 100 sends output signals V4 and/or V5 to valve 52 via input V4 and/or valve 54 via input V5 to open the valves and let a predetermined amount of oil flow into the sample bottle (not shown), during the evacuation process. Once the sample is taken, valves 52 and/or 54 close. The amount of oil needed 184 prompt is displayed asking for more or less oil, whereupon the user inputs more or less by switch 130 at which time the display prompts to add "x" number of quarts 186 when done with filter change and step 196 then activated. After actuating YES, the user is prompted to make the connections 188 to engine 16 at which time the oil from engine 16 is vacated in the same manner as described above in connection with FIG. 5, as well as the change of oil filters 192, with the addition of an optional buzzer prompt 194 that alerts the user that is it time to change the filter. A YES response and switch actuation to the completion of changing oil filters activates the fill process thus supplying new oil from new fluid containment area 116 into engine 16 as described above. When this is accomplished, the user is prompted to check the newly installed oil level 198.

Referring now to the flow diagram of FIG. 6, the flow diagram common to both FIGS. 5 and 7, once the user has checked the oil level, the user is prompted for additional oil 200, whereupon a YES response will allow the user to enter the amount of additional oil necessary 202 by activating the more/less switch 130 displaying the amount to be added 202 which is then displayed by adding "x" quarts 204. The process of adding additional oil is the same as that for originally adding oil. Once the additional oil has been added to engine 16, the display prompts the user that the additional oil has been added and again to check the oil level 208. The user is then prompted for more oil with a YES response at which time the sequence is started over. At this time, an optional see attendant 212 may be displayed prompting the attendant to check oil level 214 and add or remove oil 216 and to enter the amount 218 and double checks 220 the correct amount.

Once the process is complete, the user is prompted to remove the connection 222 which consists of detaching quick disconnects 20 and 80 after which the process is deemed complete 224 and the original welcome is displayed 226.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A computerized fluid exchange and reconciliation apparatus for engines, said apparatus comprising:

input means for displaying an operator query and providing an input signal based on an operator response;

computer means for receiving and processing said input signal, said computer means generating an output signal based on said input signal and a predetermined program; and operating means responsive to said output signal to convey a measured volume of liquid from and to an engine.

2. The apparatus of claim 1 wherein said computer means comprises a central processing unit with inputs connected to flow monitoring devices and outputs operably connected to solenoid valves.

3. The apparatus of claim 1 wherein said computer means includes memory means and a flow meter that produces a flow signal indicative of the liquid flowing into and out of said apparatus, said computer means recording said flow signal in said memory means.

4. The apparatus of claim 3 further comprising a peripheral device for tabulating signals, said computer means transferring said recorded flow signals to said peripheral device.

5. The apparatus of claim 1 wherein said input means includes an information screen.

6. The apparatus of claim 5 wherein said input means further includes information block means for displaying messages and prompting the operator for responses.

7. The apparatus of claim 1 wherein said input means includes a switch for the operator to actuate in responding to a query.

8. The apparatus of claim 7 wherein said switch comprises a dual switch.

* * * * *